United States Patent [19]
Laughlin et al.

[11] 4,429,440
[45] Feb. 7, 1984

[54] STRUT CLIP

[75] Inventors: Raymond S. Laughlin, Cuyahoga Falls; Edward J. Lynch, Jr., Akron, both of Ohio

[73] Assignee: Erico Products, Inc., Cleveland, Ohio

[21] Appl. No.: 369,463

[22] Filed: Apr. 19, 1982

[51] Int. Cl.³ ............................................... F16L 3/10
[52] U.S. Cl. ........................................ 24/486; 248/62; 248/73
[58] Field of Search .......... 24/243 B, 243 K, DIG. 9, 24/DIG. 28; 248/62, 68 R, 73

[56] References Cited

U.S. PATENT DOCUMENTS

| | | | |
|---|---|---|---|
| 421,907 | 2/1890 | Casler | 24/243 B |
| 2,176,405 | 10/1939 | Lombard | 248/73 |
| 2,863,625 | 12/1958 | Attwood | 248/62 |
| 2,938,742 | 5/1960 | Teator | 24/278 |
| 3,522,921 | 8/1970 | Lytle | 248/73 |
| 3,527,432 | 9/1970 | Lytle | 248/73 |
| 3,547,385 | 12/1970 | Kindorf et al. | 248/62 |

*Primary Examiner*—Robert A. Hafer
*Attorney, Agent, or Firm*—Maky, Renner, Otto & Boisselle

[57] ABSTRACT

A clip for supporting conduit and the like against channels, wire, rod, bar and like structural elements is formed of a metal strip of uniform width throughout its length. The ends of the strip are bent along parallel bend lines extending transversely of the strip at an acute angle to one edge of the strip to form legs extending symmetrically but in opposite directions. The area between the bend lines is provided with an extruded internally threaded aperture for a clamping fastener and opposite corners of the strip are notched to engage the structural element.

14 Claims, 6 Drawing Figures

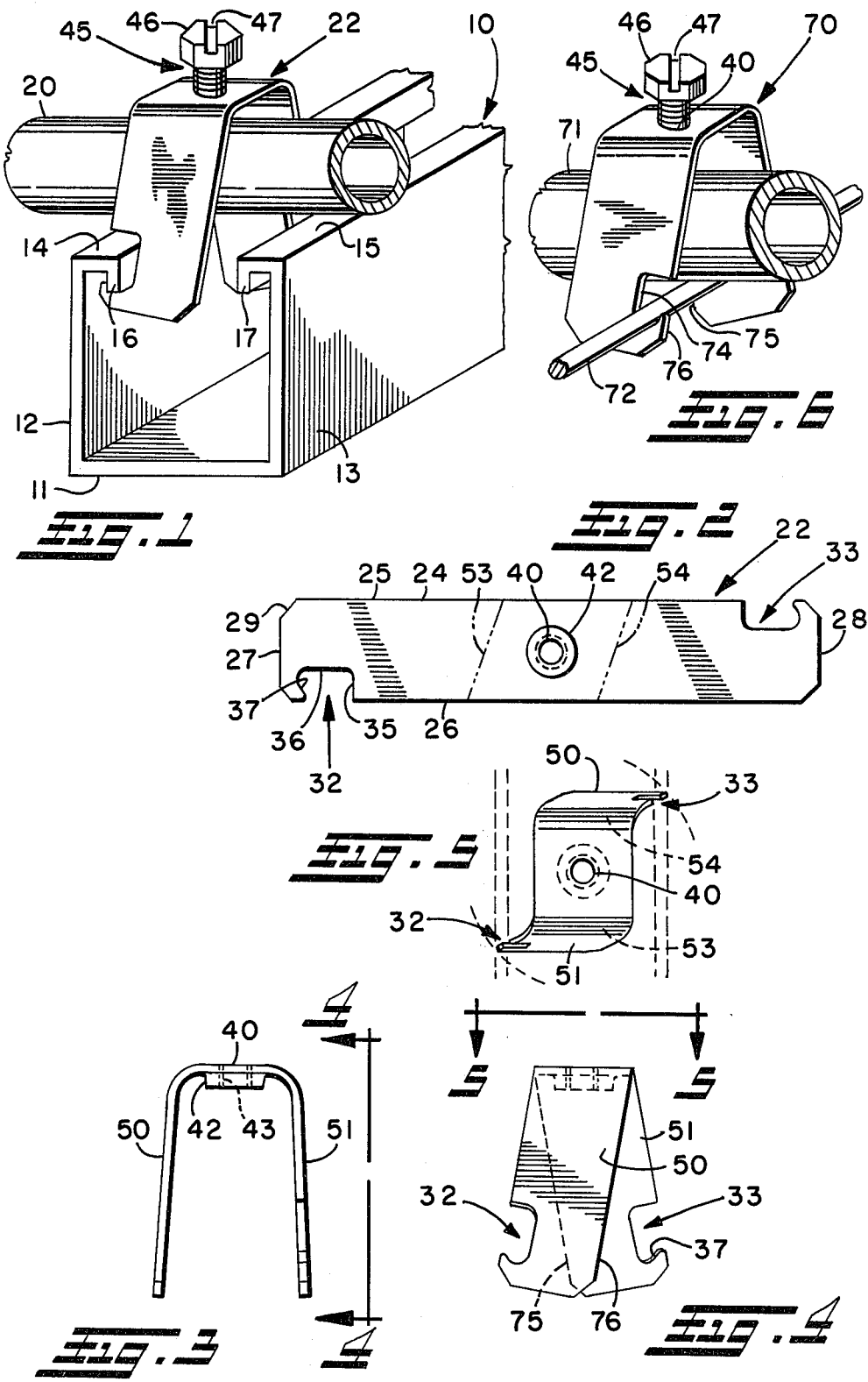

STRUT CLIP

This invention relates generally as indicated to a strut clip and more particularly to a clamping and support clip for securing pipes, tubes or like conduit to supporting structures such as channels, wire, rod, bar and the like.

BACKGROUND OF THE INVENTION

This invention relates to certain improvements in tubing supports or hangers of the type illustrated, for example, in U.S. Pat. No. 2,863,625.

Conduit clips or clamps supporting or clamping pipe or tubular elements such as conduit to structural elements such as channels, wire, rod, or bar, may take the form of multi-part C-shape clamps which employ a screw or clamp fastener to clamp the C-shape elements around the conduit. When single piece clips are employed, they may be difficult to secure in place sometimes requiring the conduit to be threaded through the clamp after being positioned on the structural element. Also, such clips usually include elongated saddle or bight portions surrounding the clip with offset legs, which, if employed with a tightening element, may provide eccentric loading and twisting components of force. Moreover, in the manufacture of such clips, large amounts of metal from the original blank are required to be removed making the clips quite costly.

SUMMARY OF THE INVENTION

The clip of the present invention utilizes a uniform width strip or strap of metal which is bent along parallel bend lines but angled with respect to the longitudinal axis of the fastener blank, or an edge thereof, to permit engagement with the opposite flange edges of a channel, wire, rod, or bar or other strut type structural member to support a maximum load. A hole or aperture in the saddle portion between the legs includes a cylindrically extruded extension which is internally threaded for a clamp screw providing the adjustment necessary to accomodate and clamp different diameters of various wall thickness conduit. Because of the relatively thin uniform width of the blank from which the clip is formed, it may rotationally adjust itself with respect to the axis of the aperture to accomodate structural components of different dimension or thickness. The ends of the strip are bent in a common direction along such parallel bend lines to form legs extending symmetrically but in oppositely angled directions. The area between the bend lines is provided with the extruded internally threaded aperture for the threaded clamping fastener and opposite corners of the strip are notched to permit ready engagement with the structural element.

It is accordingly a principle object of the present invention to provide such clip which is formed from a metal strap or strip of uniform width throughout its length.

A further important object is the provision of such clip wherein the legs are formed along parallel bend lines extending at an angle to the length of the strap or strip.

A further important object is the provision of such clip wherein the bend lines are symmetrical with the aperture in the center thereof.

It is also an important object to provide such aperture with an extruded cylindrical portion internally threaded.

These and other objects and advantages of the invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a fragmentary perspective view of the clip of the present invention clamping a conduit to a structural element such as a channel;

FIG. 2 is a plan view of a blank utilized for forming the present invention;

FIG. 3 is an edge elevation of the blank after forming;

FIG. 4 is a side elevation of the blank as seen from line 4—4 of FIG. 3;

FIG. 5 is a top plan view of the clip as seen from the line 5—5 of FIG. 4; and

FIG. 6 is a view similar to FIG. 1 illustrating a slightly modified form of the clip clamping a conduit to a structural element such as a wire, rod or bar.

DESCRIPTION OF THE PREFERRED EMBODIMENTS

Referring first to FIG. 1 there is illustrated a structural element shown generally at 10 which is in the form of a channel. Such structural channel elements include a bottom wall 11, side walls 12 and 13, and inturned top walls 14 and 15, which terminate in downturned flanges 16 and 17, respectively. Such channels are similar to structural elements manufactured and sold under such well-known trademarks as UNISTRUT and KINDORFF.

The structural element may support one or more conduits shown generally at 20 either thereon, or therefrom, if the assembly of FIG. 1 is inverted.

Support of the conduit either in pendent or supportive fashion from the structural elements is obtained by the clip 22 of the present invention.

As seen more clearly in FIG. 2, the clip 22 is formed from a blank 24 which is of uniform width but substantially elongated longitudinally. The blank which is a metal strap or strip is formed such that its length is approximately 4 to 12 times its uniform width. Its length-to-width ratio may vary depending on the size of the structural element and conduit. The width of the blank will normally remain the same. In any event, the width is uniform.

The blank when formed includes longitudinal parallel edges 25 and 26 and ends 27 and 28, the corners of which may be cropped as indicated at 29 to avoid sharp edges. The blank also includes at diagonally opposite corners notches 32 and 33, each of which includes innermost edges 35 extending normal to the edge from which it is cut, inside edges 36 parallel to the longitudinal edge of the blank, and a re-entrant edge 37 in the edge of the slot or notch nearest the end of the blank. As will be seen, the re-entrant edge of the notch forms a hook adapted to engage the inturned flanges 16 and 17 of the strut or channel 10.

To form the clip, an aperture shown generally at 40 is formed centrally in the blank by extrusion. The extrusion process forms an internal cylindrical extension 42 which permits the interior thereof as indicated at 43 to be internally threaded. Thus, one or more complete thread turns may be formed on the interior of the aperture which are designed to engage with the threaded shank of the clamping fastener shown at 45. The fastener is provided with a multi-sided head 46 which includes a transverse slot 47 so that either a wrench or a screw driver may be used to turn the same.

In order to form the legs 50 and 51 of the clip, they are bent from the blank in a common direction on parallel bend lines seen generally at 53 and 54 in FIG. 2 extending transversely of the strip or strap at an acute angle to one edge of the strip. Such legs extend symmetrically but in opposite angled directions as seen in FIG. 4. The bend lines are preferable symmetrically disposed with respect to the aperture 40.

Also, as seen more clearly in FIG. 3, the legs are bent to be not quite parallel, but in such view extend at a slight angle symmetrically of the axis of the aperture. Moreover, beyond the radius of the bend, the legs are flat or planar.

It is noted that the bend lines 53 and 54 extend transversely of the strip at an acute angle to one edge or the longitudinal axis of the strip to form the legs. The acute angle of the bend lines with respect to the edge may be from about 10° to about 25°.

Also, as indicated in FIG. 5, it will be appreciated that the clip may be rotated about the axis of the aperture 40 as seen by the phantom line arcs 60 and 61 to vary the chordal spacing of the notches from the center of the aperture 40 to assist in insertion and to accomodate internal flange widths of various size channel structural elements, the diameter of the conduit being clamped permitting. The narrow width of the blank of the strip or strap from which the clip is formed enhances the ability of the clip to be rotated about its axis to engage structural channel members of varying internal open width, as seen by the paired phantom lines 62 and 63.

With reference to FIG. 6, there is shown essentially the same clip 70 clamping a conduit 71 to a structural element 72 such as a wire, rod or bar. The only difference in the configuration of the clip is that the notches 74 are formed or cut in the diagonally opposite inside edges of the strap or strip, seen at 75 and 76, instead of the diagonally opposite outside edges seen in the embodiment of FIGS. 1-5. The notches may, however, be specially configured to conform to the structural element involved. In either embodiment, the bearing area of the clip against the structural element and the threaded stud against the conduit may be aligned or in the same plane to avoid torsional or twisting clamping forces. Again, the diameter of the conduit permitting, the clip may readily be rotated about the axis of the aperture 40 changing the chordal spacing of the notches 74 permitting the clip 70 to be assembled on the structural element 72 with the conduit in place.

In either embodiment the notches are aligned with each other and the axis of the aperture. In the embodiment of FIG. 1 the alignment of the notches is at an angle to, albeit below, the axis of the conduit, while in FIG. 6, the alignment is substantially normal to the axis of the conduit.

In any event, it is believed apparent that there is provided a low cost clip which may be formed of uniform width material which is bent along parallel lines to form legs extending angularly oppositely and symmetrically with respect to the unbent portion of the clip. Notch means in lateral edges diagonally opposite each other are provided whereby the clip may be engaged in the edges of a channel, rod, wire or bar and the like to support a conduit and the like thereagainst either above or below.

We claim:

1. A clip comprising a metal strip of uniform width throughout its length, an aperture adapted to hold a fastener in the center of said strip, the ends of said strip being bent in the same direction along parallel lines extending at an acute angle to the length of the strip and symmetrical with the aperture to form legs extending angularly oppositely and symmetrically but generally parallel with respect to the axis of the aperture, and notch means in each lateral edge diagonally opposite each other whereby the clip may be engaged against a structural element and the like to support a conduit or the like thereagainst.

2. A clip as set forth in claim 1 wherein said aperture includes a cylindrical extension, said extension being internally threaded.

3. A clip as set forth in claim 2 wherein said extension is formed integrally from said strip.

4. A clip as set forth in claim 3 wherein said extension extends in the same direction as said legs.

5. A clip as set forth in claim 4 wherein said fastener is a threaded stud in said aperture operative to engage such conduit or the like and clamp the same against the structural element and the like.

6. A clip as set forth in claim 1 wherein said strip is of a length from about 4 to 12 times its uniform width.

7. A clip as set forth in claim 1 including a re-entrant edge in said notches nearest the ends of the legs to facilitate engagement with the edges of the structural element.

8. A clip as set forth in claim 1 wherein the angle of such lines along which the strip is bent is from about 10° to about 25° with respect to a longitudinal edge of the strip.

9. A clip as set forth in claim 1 wherein the lines along which the strip is bent are spaced to form a bight portion between the legs of the clip somewhat larger than the diameter of a conduit to be supported to enable the clip to be rotated about the axis of the aperture.

10. A clip as set forth in claim 1 wherein the legs are straight beyond the formed bend and are in planes symmetrical to and at a slight angle to the axis of the aperture.

11. A clip as set forth in claim 1 wherein the notches are in the diagonally opposite inside edges of the strip.

12. A clip as set forth in claim 11 wherein the notches are substantially aligned with each other through the axis of the aperture and substantially normal to the axis of such conduit.

13. A clip as set forth in claim 1 wherein the notches are in the diagonally opposite outside edges of the strip.

14. A clip as set forth in claim 13 wherein the notches are substantially aligned with each other through the axis of the aperture and at an angle to the axis of such conduit.

* * * * *